(12) United States Patent
Miura

(10) Patent No.: US 12,230,084 B2
(45) Date of Patent: Feb. 18, 2025

(54) GATE APPARATUS

(71) Applicant: NEC Corporation, Tokyo (JP)

(72) Inventor: Kazuki Miura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 44 days.

(21) Appl. No.: 18/022,628

(22) PCT Filed: Aug. 27, 2020

(86) PCT No.: PCT/JP2020/032365
§ 371 (c)(1),
(2) Date: Feb. 22, 2023

(87) PCT Pub. No.: WO2022/044202
PCT Pub. Date: Mar. 3, 2022

(65) Prior Publication Data
US 2023/0316837 A1 Oct. 5, 2023

(51) Int. Cl.
G07C 9/15 (2020.01)
G07C 9/20 (2020.01)
H01Q 17/00 (2006.01)

(52) U.S. Cl.
CPC ............... G07C 9/15 (2020.01); G07C 9/20 (2020.01); H01Q 17/00 (2013.01)

(58) Field of Classification Search
CPC . G07C 9/15; G07C 9/20; H01Q 17/00; H01Q 1/2216; G07G 1/009
See application file for complete search history.

(56) References Cited

U.S. PATENT DOCUMENTS

| 9,760,826 | B1 | 9/2017 | Stine et al. | |
| 2010/0073141 | A1 | 3/2010 | Nishida et al. | |
| 2018/0366823 | A1* | 12/2018 | Liu | H01Q 1/42 |
| 2019/0138772 | A1 | 5/2019 | Sakurai | |
| 2019/0311164 | A1 | 10/2019 | Teter et al. | |
| 2020/0226331 | A1 | 7/2020 | Khojastepour et al. | |

FOREIGN PATENT DOCUMENTS

| JP | 2008-234527 A | 10/2008 |
| JP | 2019-087137 A | 6/2019 |
| JP | 2020-038544 A | 3/2020 |
| JP | 2020-057109 A | 4/2020 |

OTHER PUBLICATIONS

International Search Report for PCT Application No. PCT/JP2020/032365, mailed on Nov. 10, 2020.

* cited by examiner

*Primary Examiner* — Vernal U Brown
(74) *Attorney, Agent, or Firm* — Sughrue Mion, PLLC

(57) ABSTRACT

A gate apparatus (10) includes first and second housing (110a, 110b) defining a passage (30) through which a person passes, a recessed portion (120) being provided on a lateral surface (112), facing the passage (30), of at least one of housings being the first housing (110a) and the second housing (110b), a first antenna (130) being provided in the recessed portion (120), and a radio wave absorbing material (142, 144) being provided in a region (an inner lateral surface 122, and a region 124 of the lateral surface 112) of the lateral surface (112) providing the recessed portion (120) being located closer to the passage (30) side than the first antenna (130).

7 Claims, 8 Drawing Sheets

GATE APPARATUS

This application is a National Stage Entry of PCT/JP2020/032365 filed on Aug. 27, 2020, the contents of all of which are incorporated herein by reference, in their entirety.

TECHNICAL FIELD

The present invention relates to a gate apparatus.

BACKGROUND ART

In recent years, in order to settle a product with a radio frequency (RF) tag, a walkthrough gate for settlement that can read an RF tag, acquire product information, and pay for the product has been developed.

For example, Patent Document 1 describes a communication gate being provided at an entrance/exit of a facility and reading identification information from an RF tag attached to an article carried by a passerby passing through the entrance/exit. It is described that the gate includes a pair of side wall portions being arranged in facing each other in such a way as to sandwich a passage, and a ceiling portion, and the side wall portion includes a radio wave absorber, and an antenna that wirelessly communicates with an RF tag. The radio wave absorber is also formed in a portion protruding toward a passage side of the side wall portion, and leakage of a radio wave to outside of the gate is suppressed by the configuration.

It is described that an electronic tag reading system described in Patent Document 2 causes a customer to pass through a customer passage in a state where a product is held, causes the product to pass through a product passage along with a movement of the customer, and thereby reads product information stored in an electronic tag attached to the product by a reading apparatus via an antenna provided in the product passage. It is described that a plurality of antennas are provided on side walls provided on both sides of the product passage, and also that the side wall is formed of a radio wave absorber for reducing leakage of a radio wave.

In a radio frequency identification (RFID) gate structure described in Patent Document 3, an RFID antenna is arranged on both sides of a passage, and a radio wave absorbing wall is arranged on an opposite side of each RFID antenna with the passage interposed therebetween. The radio wave absorbing wall includes a central plate and a plate forming the radio wave absorbing wall in such a way as to be foldable in front of and behind the central plate. A radio wave leaking to outside of the gate is reduced by the front and back radio wave absorbing walls.

RELATED DOCUMENTS

Patent Documents

[Patent Document 1] Japanese Patent Application Publication No. 2020-038544
[Patent Document 2] Japanese Patent Application Publication No. 2020-57109
[Patent Document 3] Japanese Patent Application Publication No. 2008-234527
[Patent Document 4] Japanese Patent Application Publication No. 2019-87137

SUMMARY OF INVENTION

Technical Problem

With regard to reading of an RF tag, when an output of a reader is increased in order to increase a reading rate of product information, a communication range is widened, but there is a possibility that information of the RF tag which is not desired to be read is erroneously read. Therefore, it is difficult to adjust the output of the reader.

In a reading apparatus described in Patent Document 4 in which a product is placed on a placing table and a product information is read from an RFID tag attached to the product, arrangement of an RFID antenna is devised in order to solve the above-described problem.

However, in a case of a walkthrough gate for settlement, since a size (width and length) of the gate is large and information needs to be read from an RF tag moving with a person, it is troublesome to adjust an antenna position.

The present invention has been made in view of the above-described circumstances, and an object thereof is to improve reading accuracy of an RF tag passing through a gate.

Solution to Problem

In each aspect according to the present invention, the following configurations are employed in order to solve the above-described problem.
A first aspect relates to a gate apparatus.
A gate apparatus according to the first aspect includes:
first and second housings defining a passage through which a person passes;
a recessed portion being provided in a lateral surface, facing the passage, of at least one of housings being the first housing and the second housing;
a first antenna being provided in the recessed portion; and
a radio wave absorbing material being provided in a region located closer to the passage side than the first antenna.

Note that, any combination of the above-described components and expression of the present invention being converted among a method, an apparatus, a system, a storage medium, a computer program, and the like are also effective as a manner of the present invention.

Further, various components according to the present invention do not necessarily need to be an individually independent presence, and a plurality of components may be formed as one member, one component may be formed of a plurality of members, a certain component may be a part of another component, a part of a certain component and a part of another component may overlap each other, and the like.

Further, although a plurality of procedures are described in an order in a method and a computer program according to the present invention, the order of the description is not intended to limit an order in which the plurality of procedures are executed. Thus, when the method and the computer program according to the present invention are implemented, an order of the plurality of procedures can be changed within a range that does not interfere with a content.

Furthermore, a plurality of procedures of the method and the computer program according to the present invention are not limited to being executed at individually different timings. Thus, another procedure may occur during execution of a certain procedure, an execution timing of a certain procedure and an execution timing of another procedure may partially or entirely overlap each other, and the like.

Advantageous Effects of Invention

According to each of the aspects described above, reading accuracy of a RF tag passing through a gate can be improved.

EXAMPLE EMBODIMENT

Hereinafter, an example embodiment of the present invention will be described with reference to the drawings. Note that, in all the drawings, a similar component is denoted by a similar reference sign, and description thereof will be omitted as appropriate. Further, in each drawing below, a configuration of a part not related to essence of the present invention is omitted, and is not illustrated.

"Acquisition" in an example embodiment includes at least one of acquisition (active acquisition), by its own apparatus, of data or information being stored in another apparatus or a storage medium, and inputting (passive acquisition) of data or information output from another apparatus to its own apparatus. Examples of the active acquisition include reception of a reply by making a request or inquiry to another apparatus, reading by accessing another apparatus or a storage medium, and the like. Further, examples of the passive acquisition include reception of information to be distributed (transmitted, push-notified, or the like), and the like. Furthermore, "acquisition" may include acquisition by selection from among pieces of received data or pieces of received information, or reception by selecting distributed data or distributed information.

First Example Embodiment

Figure 1:
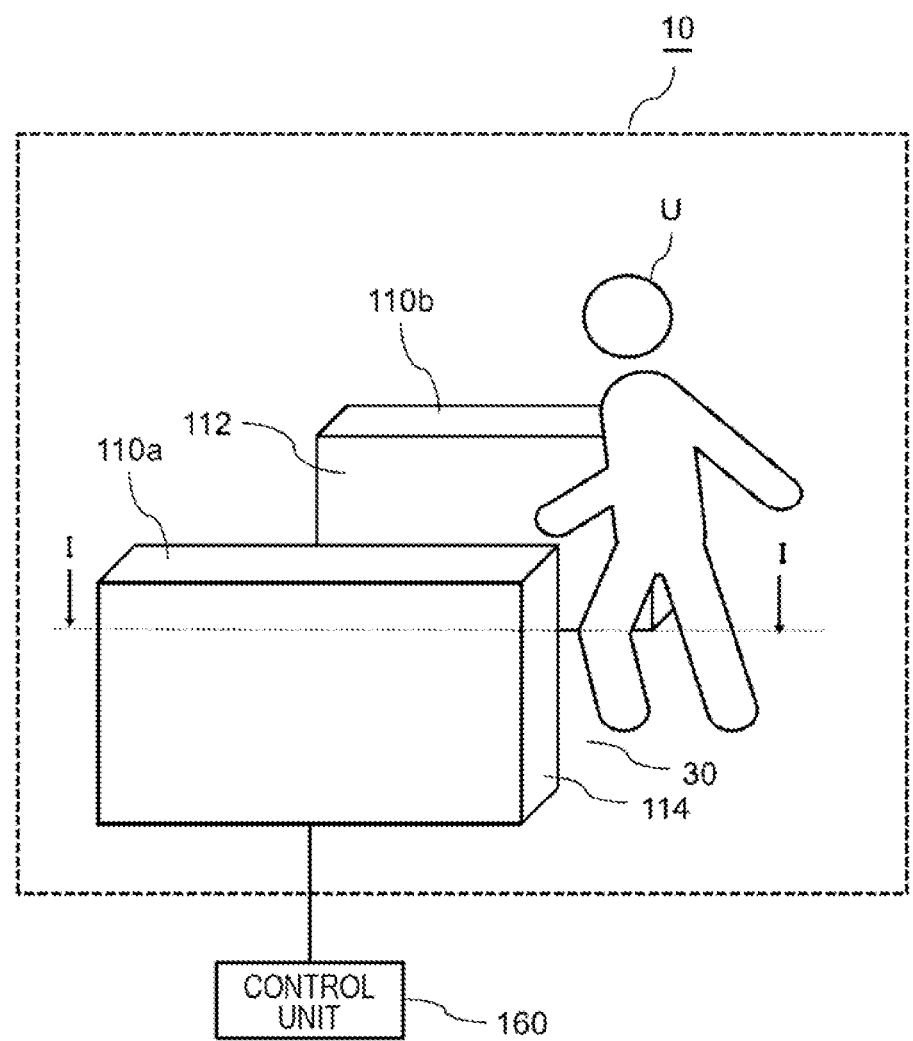
FIG. 1 is a diagram illustrating a usage example of a gate apparatus according to an example embodiment of the present invention.

FIG. 1 is a diagram illustrating a usage example of a gate apparatus 10 according to an example embodiment of the present invention. The gate apparatus 10 includes a first housing 110a and a second housing 110b defining a passage 30 through which a person U passes. A housing 110 extends a predetermined distance along an exit from an entrance of the passage 30 through which the person U passes. The two housings 110 are installed on both sides of the passage 30 in parallel to each other with a space therebetween. Preferably, the two housings 110 are installed in parallel.

The gate apparatus 10 includes an antenna (first antenna 130 in FIG. 2 described later) for reading a radio frequency (RF) tag attached to a product or the like carried by the person U passing through the passage 30, and further includes a control unit 160 for processing information read by the antenna. The at least two housings 110, or each component included in the housing 110 may be electrically connected to each other. Thus, a plurality of first antennas 130 and a second antenna 132 (FIG. 2) provided in each housing 110 can operate in cooperation with each other.

For example, the control unit 160 may perform processing of reading, by an antenna, information being stored in an RF tag attached to a product while the person U holds the product to be purchased and walks through the passage 30, and transmitting the information to a settlement apparatus (not illustrated). The RF tag attached to a product is a radio frequency identification (RFID) tag. The RFID tag includes an antenna and an IC chip. The IC chip includes a memory and a communication unit. The communication unit wirelessly communicates with an apparatus (the antenna 130 provided in the gate apparatus 10 in the present example embodiment) that reads an RFID tag via an antenna. The memory is a readable/writable memory device, and, for example, product identification information for uniquely identifying a product is written.

Figure 5:
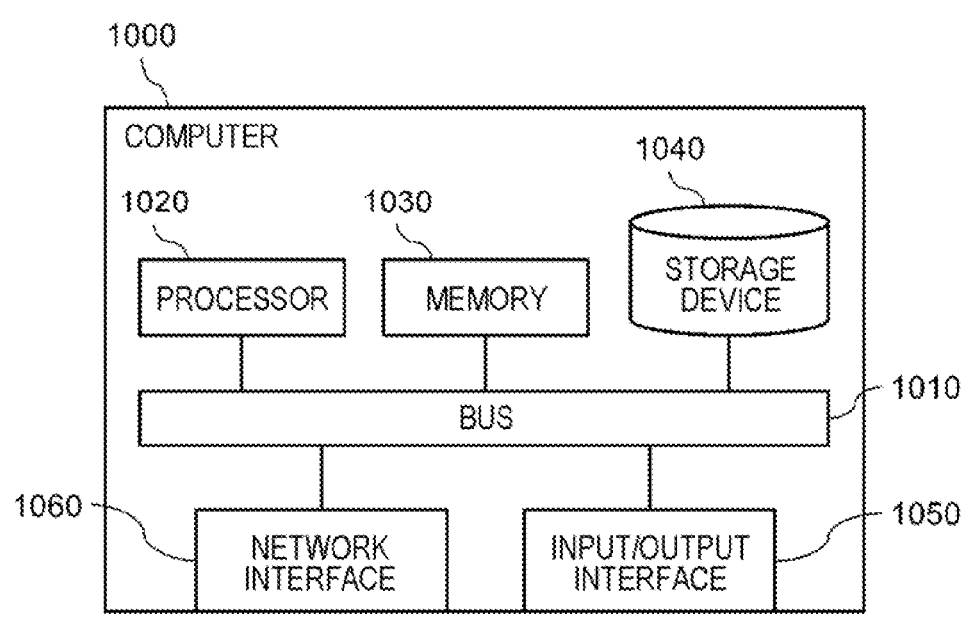
FIG. 5 is a block diagram illustrating a hardware configuration of a computer achieving a control unit of the gate apparatus in FIG. 1.

FIG. 5 is a block diagram illustrating a hardware configuration of a computer achieving the control unit 160.

The computer (control unit 160) includes a bus 1010, a processor 1020, a memory 1030, a storage device 1040, an input/output interface 1050, and a network interface 1060.

The bus 1010 is a data transmission path through which the processor 1020, the memory 1030, the storage device 1040, the input/output interface 1050, and the network interface 1060 transmit and receive data to and from one another. However, a method of mutually connecting the processors 1020 and the like is not limited to bus connection.

The processor 1020 is a processor achieved by a central processing unit (CPU), a graphics processing unit (GPU), or the like.

The memory 1030 is a main storage apparatus achieved by a random access memory (RAM) or the like.

The storage device 1040 is an auxiliary storage apparatus achieved by a hard disk drive (HDD), a solid state drive (SSD), a memory card, a read only memory (ROM), or the like. The storage device 1040 stores a program module that achieves each function (for example, a settlement function) of the control unit 160. The processor 1020 reads each program module on the memory 1030 and executes the program module, and thereby each function associated to the program module is achieved.

The program module may be stored on a storage medium. The storage medium storing the program module includes a non-transitory tangible computer usable medium, and a program code being readable by a computer (processor 1020) may be embedded in the medium.

The input/output interface 1050 is an interface for connecting a computer and various pieces of input/output equipment with each other. The input/output interface 1050 also functions as a communication interface that performs short-range radio communication such as a Bluetooth (registered trademark) and a near field communication (NFC).

The network interface 1060 is an interface for connecting a computer to a communication network. The communication network is, for example, a local area network (LAN) or a wide area network (WAN). A method of connecting the network interface 1060 to a communication network may be a wireless connection, or may be a wired connection.

Then, the computer is connected to necessary equipment (for example, the first antenna 130, the second antenna 132, a sensor 150, a sensor 152, an opening/closing control unit 22 of an opening/closing door 20, and the like) via the input/output interface 1050 or the network interface 1060.

Figure 2:
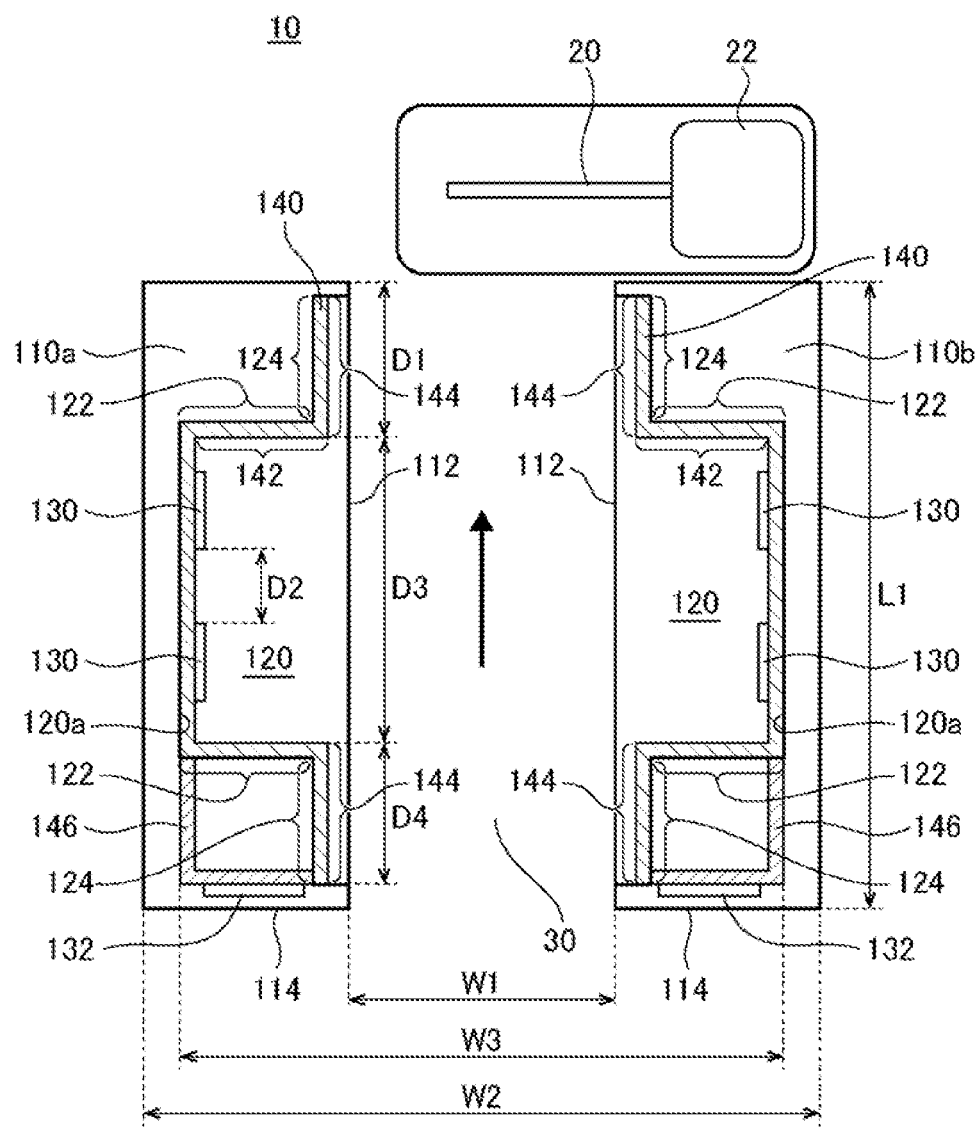
FIG. 2 is a cross-sectional view of the gate apparatus in FIG. 1 viewed from a line I-I.

FIG. 2 is a cross-sectional view of the gate apparatus 10 in FIG. 1 viewed from a line I-I.

The gate apparatus 10 includes the first and second housings 110*a* and 110*b* defining the passage 30 through which the person U passes, a recessed portion 120 being provided in a lateral surface 112, facing the passage 30, of at least one of the housings 110 being the first housing 110*a* and the second housing 110*b*, the first antenna 130 being provided in the recessed portion 120, and a radio wave absorbing material 140. Hereinafter, when it is not necessary to distinguish between the first housing 110*a* and the second housing 110*b*, it is also simply referred to as the housing 110.

The radio wave absorbing material 140 is made of a material that absorbs a radio wave being emitted from the first antenna 130, and is a plate or sheet-like member having a predetermined thickness.

The radio wave absorbing material 140 includes portions (indicated by reference signs 142 and 144) provided in each of a region (inner lateral surface 122) and a region 124 located closer to the passage 30 than the first antenna 130.

The radio wave absorbing material 140 is provided on a region which is equivalent to a region (the inner lateral surface 122 of the recessed portion 120 and the region 124 of the lateral surface 112) located closer to the passage 30 side than the first antenna 130, and at least a part of an outer periphery of a region where the first antenna 130 is provided. In other words, the radio wave absorbing material 140 is provided in such a way as not to cover an upper portion of the first antenna 130.

In the example in FIG. 2, the gate apparatus 10 includes the recessed portion 120, the first antenna 130, and the radio wave absorbing material 140 in both the first housing 110*a* and the second housing 110*b*.

However, as described above, the gate apparatus 10 may include the recessed portion 120, the first antenna 130, and the radio wave absorbing material 140 in at least one of the housings 110 being the first housing 110*a* and the second housing 110*b*.

However, when the recessed portion 120 and the first antenna 130 are provided in only one of the housings 110, the radio wave absorbing material 140 is provided in other housing 110. In this case, the recessed portion 120 may or may not be provided in the other housing 110. In a case of a configuration in which the recessed portion 120 is not provided, the radio wave absorbing material 140 is preferably provided in such a way as to cover an irradiation range of a radio wave being emitted from the first antenna 130 opposed to the radio wave absorbing material 140 in the lateral surface 112 of the housing 110.

In the example in FIG. 2, the opening/closing door 20 is provided on an exit side of the gate apparatus 10, and the opening/closing door 20 is controlled to open/close by a rotation control unit 22. Opening and closing of the opening/closing door 20 releases an exit in such a way that the person U can pass through the passage 30, or blocks the exit in such a way that the person U cannot pass through the passage 30.

The lateral surface 112 of the housing 110 defines a passage for a person within the gate apparatus 10. Then, the recessed portion 120 is a region recessed from the lateral surface 112 of the housing 110. Note that, a cover may be provided on the lateral surface 112. In this case, the passage for a person within the gate apparatus 10 is defined by the cover, and the recessed portion 120 is not exposed. In the example in FIG. 2, the recessed portion 120 has a rectangular parallelepiped shape (a U-shape in a cross section) recessed from the lateral surface 112 of the housing 110 to a side opposite to the passage 30. In FIG. 2, the recessed portion 120 includes a bottom surface 120*a* that faces substantially the same direction as the lateral surface 112, and the inner lateral surface 122 that rises from the bottom surface 120*a* toward the lateral surface 112. Further, the lateral surface 112 includes the region 124 where the recessed portion 120 is not formed. However, a shape of the recessed portion 120 may be a spindle shape, may be a shape acquired by cutting an upper portion of a pyramid, or may be a partially curved shape.

Further, there is a case where a boundary between the lateral surface 112 and the bottom surface 120*a* is unclear. Furthermore, the inner lateral surface 122 may be oblique with respect to the lateral surface 112. In this case, the bottom surface 120*a* is not provided, and the recessed portion 120 may be formed by the two oblique inner lateral surfaces 122. In this case, the first antenna 130 is provided on the inner lateral surface 122. The radio wave absorbing material 140 is provided in at least a part of the region 124 of the lateral surface 112, and further the inner lateral surface 122 of the recessed portion 120, and the bottom surface 120*a* of the recessed portion 120.

Figure 3:
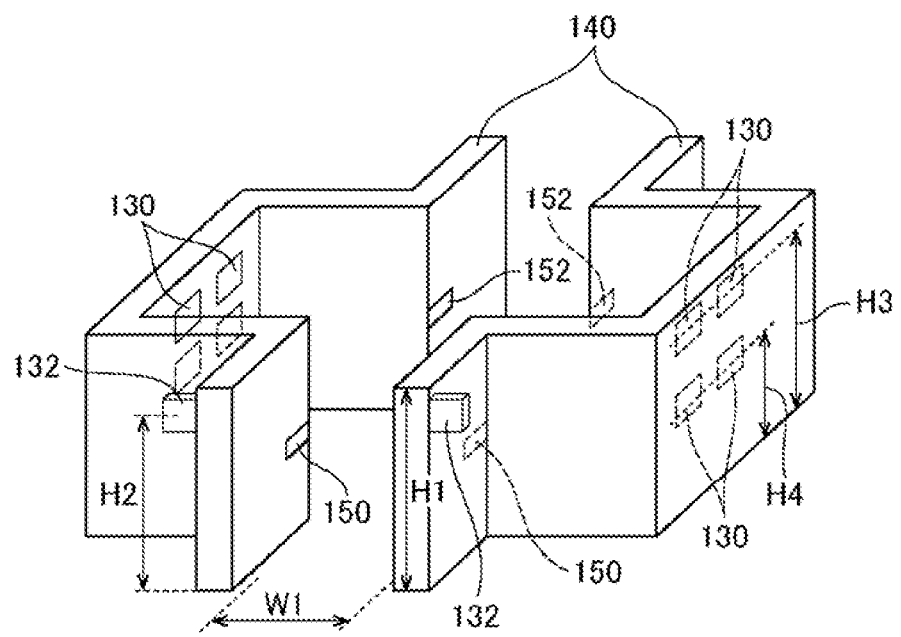
FIG. 3 is a perspective view illustrating an arrangement example when a radio wave absorbing material in FIG. 2 is arranged in a housing.
Figure 4:
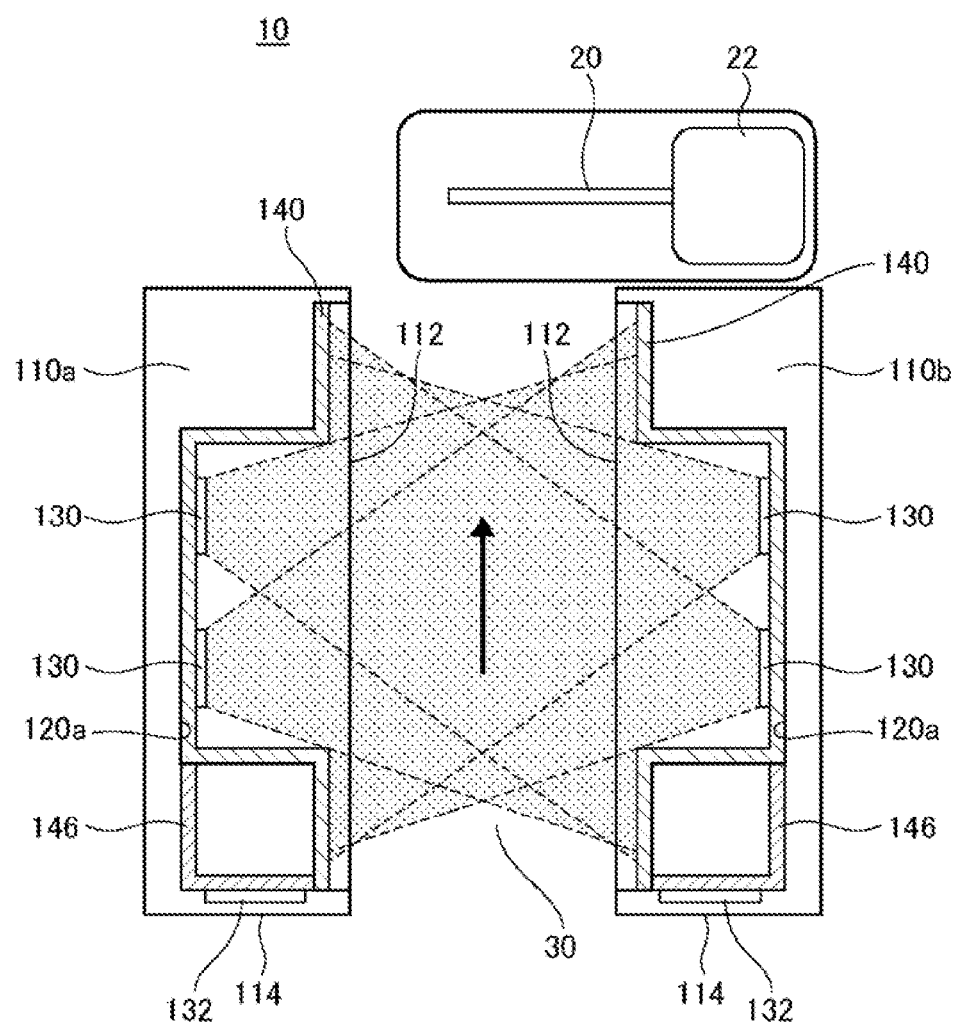
FIG. 4 is a diagram illustrating an irradiation range of a radio wave emitted from each first antenna.

FIG. 3 is a perspective view illustrating an arrangement example when the radio wave absorbing material 140 in FIG. 2 is arranged within the housing 110. FIG. 4 illustrates an irradiation range of a radio wave being emitted from each first antenna 130 in a shaded manner.

The first antenna 130 reads an RF tag that moves together with the person U passing through the passage 30. Information being read from the RF tag is transmitted to the control unit 160.

A radio wave is emitted, from each first antenna 130, toward a front of the first antenna 130 at a predetermined irradiation angle. An irradiation range (angle) of the first antenna 130 is adjusted according to a position and an installation range of the radio wave absorbing material 140. The irradiation range of a radio wave being emitted from at least the first antenna 130 does not exceed the region 144 of the radio wave absorbing material 140 being provided on the lateral surface 112 of other housing 110 on a facing side. In other words, the radio wave absorbing material 140 prevents a radio wave emitted from the first antenna 130 from leaking out of the passage 30.

In the example of the present example embodiment, four first antennas 130 are provided on the bottom surface 120*a* of the recessed portion 120 in vertical and horizontal directions. The second antenna 132 is provided at a position associated to a front surface 114 of each housing 110.

Further, a pair of human sensors 150 and a pair of human sensors 152 are provided on each of an entrance side and the exit side of the lateral surface 112 of each housing 110. The human sensors 150 and 152 are, for example, infrared sensors. The person U entering the gate apparatus 10 or exiting the gate apparatus 10 is detected. For example, when the human sensor 150 on the entrance side detects entry of the person U into the gate apparatus 10, the control unit 160 may start processing of reading an RF tag by the first antenna 130. Further, when the human sensor 152 on the exit side detects that the person U has exited from the gate apparatus 10, the control unit 160 may end processing of reading an RF tag by the first antenna 130.

As one example, each dimension of the gate apparatus 10 is as follows. However, the following is one example, and is not limited thereto.

A width W1 of the passage 30 is 75 cm. A length of the passage 30, at least a length L1 of the housing 110, is 140 cm. A height of the housing 110 is 110 cm. A width of the housing 110 is 40 cm. A distance W2 between outer lateral surfaces when the two housings 110 are arranged side by side is 155 cm. A spacing W3 between the bottom surfaces 120a of the recessed portion 120 of the two housings 110 is 135 cm.

A height H1 of the radio wave absorbing material 140 is 100 cm. The first antennas 130 provided in the radio wave absorbing material 140 are provided in such a way that the center thereof has a height H3 and a height H4 lower than the height H3. The second antenna 132 is provided in such a way that the center thereof has a height H2. The height H2 is 50 cm, the height H3 is 80 cm, and the height H4 is 40 cm.

The first antenna 130 is a square having a side of 12 cm. A spacing D2 between the first antennas 130 in a traveling direction of the passage 30 is 30 cm. A length D3 of the bottom surface 120a of the recessed portion 120 in the traveling direction of the passage 30 is 70 cm. A depth of the recessed portion 120 (a height of the inner lateral surface 122) is 26.3 cm. A length in the traveling direction of the passage 30 in the region 124 where the recessed portion 120 of the lateral surface 112 is not formed is 30 cm for both a D4 on the entrance side and a D1 on the exit side.

The radio wave absorbing material 144, which is a part of the radio wave absorbing material 140, is provided in the region 124 of the lateral surface 112 where the recessed portion 120 is not formed. The radio wave absorbing material 144 is provided in such a way as to have a length that covers an irradiation range of a radio wave being emitted from the first antenna 130 opposed to the radio wave absorbing material 144. The length D1 of the region 124, that is, an installation range of the radio wave absorbing material 144 can be computed from the installation position of the first antenna 130, the irradiation angle, the depth of the recessed portion 120, and the like.

Figure 6:
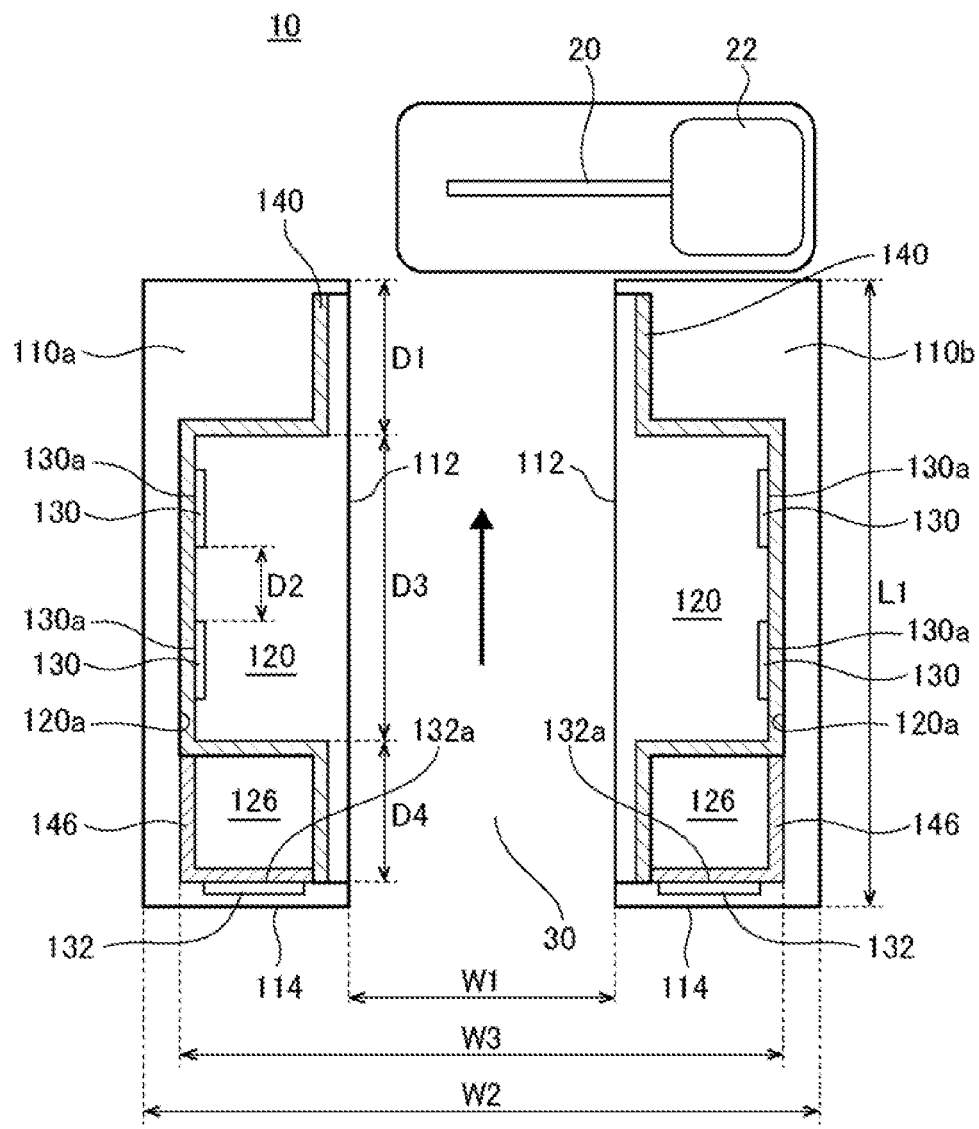
FIG. 6 is a cross-sectional view of the gate apparatus in FIG. 1 viewed from the line I-I.

Further, as illustrated in FIG. 6, the radio wave absorbing material 140 is also provided on a back surface 130a side of the first antenna 130 in the recessed portion 120. However, in a case where the first antenna 130 does not transmit a radio wave, the radio wave absorbing material 140 may not be provided in a region of the bottom surface 120a being equivalent to a region right in the back of the back surface 130a of the first antenna 130.

The radio wave absorbing material 140 covers at least a range being irradiated from the first antenna 130 provided in the recessed portion 120 of other housing 110 on a facing side.

The gate apparatus 10 further includes the second antenna 132 being provided on the entrance side of the passage 30. The radio wave absorbing material 140 is further provided on a back surface 132a side of the second antenna 132. A radio wave absorbing material on the back surface 132a side of the second antenna 132 is illustrated by a reference sign 146.

A cavity 126 having a rectangular cross section is formed in the housing 110 by the radio wave absorbing material 140 and the radio wave absorbing material 146. Since a radio wave does not enter the cavity 126, equipment in which influence of a radio wave is concerned may be accommodated in the cavity 126.

The second antenna 132 reads information of an RF tag existing outside of the passage 30. By subtracting the information of the RF tag read by the second antenna 132 from information read by the first antenna 130, it is possible to exclude information of the RF tag existing outside of the passage 30 when the first antenna 130 erroneously reads the information of the RF tag existing outside of the passage 30. Thus, reading accuracy of the first antenna 130 can be improved.

As described above, in the gate apparatus 10 according to the present example embodiment, the recessed portion 120 is provided in the lateral surface 112, facing the passage 30, of at least one of the housings 110 being the first housing 110a and the second housing 110b defining the passage 30, and the first antenna 130 is provided in the recessed portion 120. Then, the radio wave absorbing material 140 is provided in a region (the inner lateral surface 122 of the recessed portion 120 and the region 124 of the lateral surface 112) located closer to the passage 30 than the first antenna 130.

As a result, since a radio wave emitted from the first antenna 130 is efficiently absorbed by the radio wave absorbing material 140 being provided in the region located closer to the passage 30 than the first antenna 130, leakage of a radio wave to outside of the gate apparatus 10 can be reduced. Therefore, reading accuracy of an RF tag can be improved.

In particular, by providing the radio wave absorbing material 140 at a position (the region 124 of the lateral surface 112) associated to at least a part of a portion of the lateral surface 112 where the recessed portion 120 is not formed, it is possible to efficiently suppress leakage of a radio wave being emitted from the first antenna 130 to the outside of the gate apparatus 10.

Comparative Example 1

Figure 7:
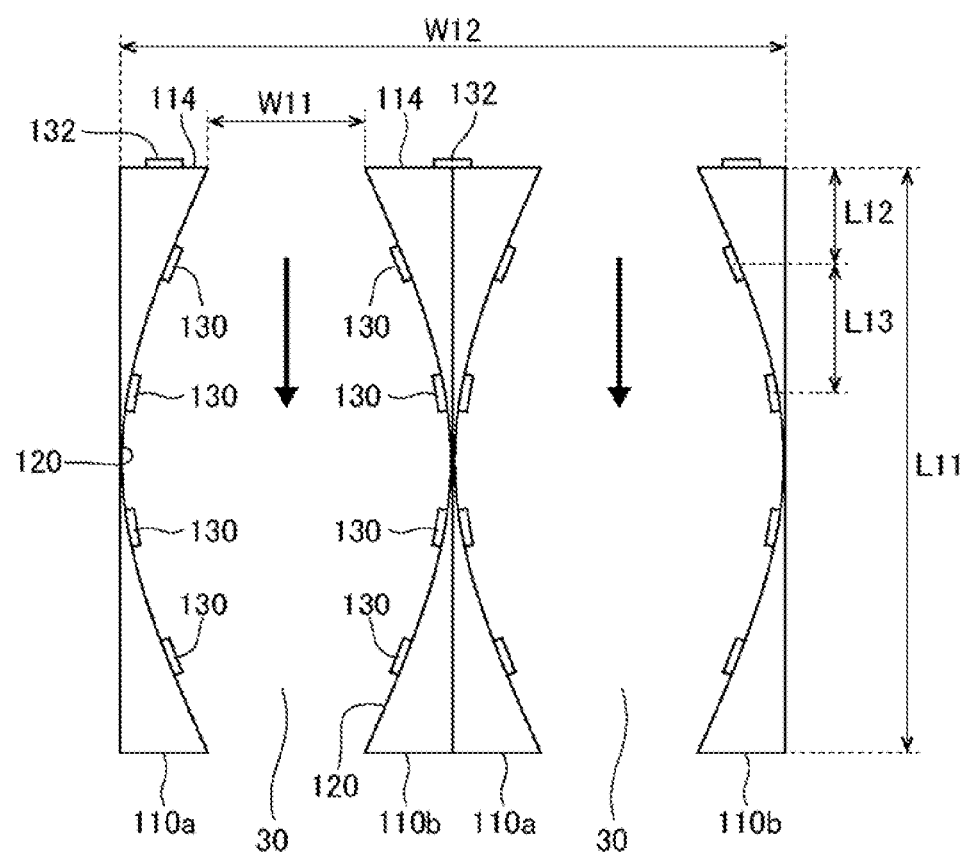
FIG. 7 is a diagram illustrating a configuration of a comparative example 1 of a gate apparatus.

FIG. 7 is a diagram illustrating a configuration of a comparative example 1 of a gate apparatus 10. The gate apparatus 10 of the comparative example 1 is different from the first example embodiment in that a cross section of a housing 110 has an arcuate recessed portion 120.

A bottom surface 120a of the recessed portion 120 is formed on an entire lateral surface 112 of at least one of the housings 110. In this example, a length L11 of a passage 30 is 231 cm. A width W11 of the passage 30 is 60 cm. A distance W12 of an outer lateral surface of the housing 110 in which two pairs of the housings 110 are arranged side by side is 266 cm.

Each housing 110 is provided with a second antenna 132 on a front surface 114, and four first antennas 130 are provided side by side at an equal interval at a height H3 and a height H4 toward a traveling direction of the passage 30.

A distance L12 from the front surface 114 of the housing 110 to the center of the first antenna 130 toward the traveling direction of the passage 30 is 40 cm. A spacing L13 between the center of each first antenna 130 is 50 cm.

Since the four first antennas 130 are provided on the arcuate bottom surface 120a of the recessed portion 120, a radio wave being emitted from each first antenna 130 is irradiated toward the center of the passage 30. A radio wave being emitted from the first antenna 130 is irregularly reflected on a surface of the recessed portion 120 of the housing 110 on a facing side, and reading accuracy of an RF tag is not improved.

Comparative Example 2

Figure 8:
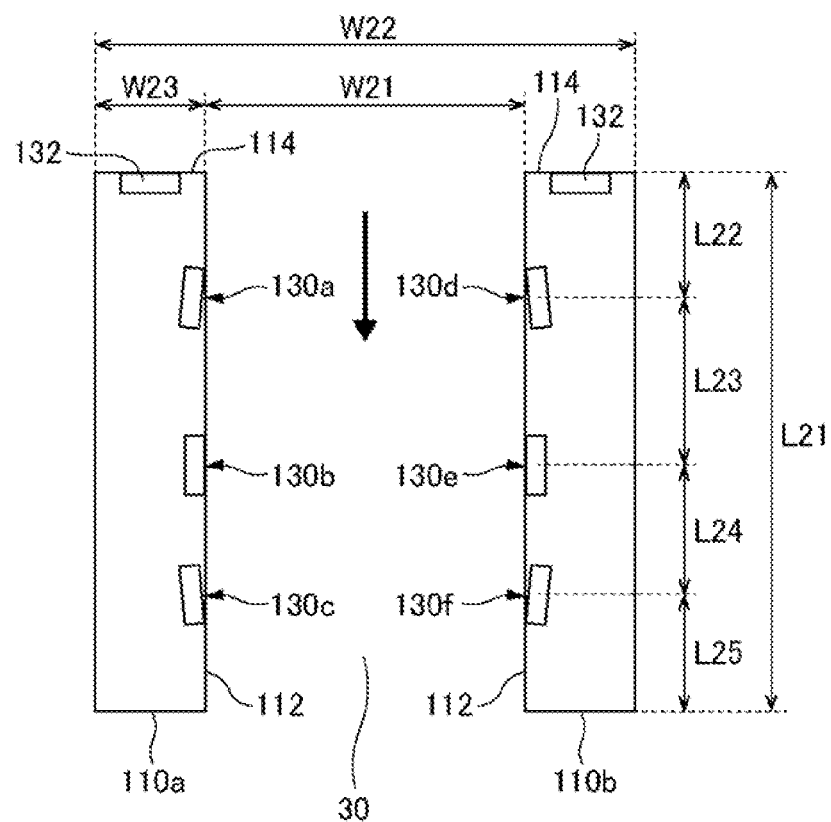
FIG. 8 is a diagram illustrating a configuration of a comparative example 2 of a gate apparatus.

FIG. 8 is a diagram illustrating a configuration of a comparative example 2 of a gate apparatus 10. The gate apparatus 10 of the comparative example 2 is different from the first example embodiment in that, instead of providing a recessed portion 120 in a housing 110, each first antenna 130 is installed on a lateral surface 112 of the housing 110 in such a way that an irradiation direction of each first antenna 130 is set toward the center of a passage 30.

In this example, the three first antennas 130 are arranged at a predetermined spacing from each other at a height H3 and a height H4 toward a traveling direction of the passage 30 on the lateral surface 112 of a passage 30 side of at least one of the housings 110 being a first housing 110a and a second housing 110b. Each housing 110 is further provided with a second antenna 132 on a front surface 114.

Each of the first and third first antennas 130 toward the traveling direction of the passage 30 is inclined toward the center of the passage 30 by six degrees from a horizontal direction and by six degrees from a vertical direction. The first antenna 130 at the center (second) toward the traveling direction of the passage 30 is inclined downward by 10 degrees from the vertical direction. In this way, a radio wave being emitted from each first antenna 130 is irradiated toward the center of the passage 30.

In this example, a rebound of a radio wave emitted from the associated first antenna 130 is generated in a metal structure portion, and a readable point is appeared outside the gate, therefore reading accuracy is not improved.

Although the example embodiments of the present invention have been described above with reference to the drawings, these are exemplification of the present invention, and various configurations other than the above may be adopted.

Although the invention of the present application has been described with reference to the example embodiments and examples above, the invention of the present application is not limited to the above example embodiments and examples. Various modifications that can be understood by a person skilled in the art can be made to the configuration and details of the invention of the present application within the scope of the invention of the present application.

Note that, in the present invention, when information on a user (for example, a person U) is acquired and used, this is lawfully performed.

Some or all of the above-described example embodiments may be described as the following supplementary notes, but are not limited thereto.

1. A gate apparatus including:
    first and second housings defining a passage through which a person passes;
    a recessed portion being provided in a lateral surface, facing the passage, of at least one of housings being the first housing and the second housing;
    a first antenna being provided in the recessed portion; and
    a radio wave absorbing material being provided in a region located closer to the passage side than the first antenna.
2. The gate apparatus according to supplementary note 1, wherein
    the radio wave absorbing material is provided on a range which is equivalent to a region located closer to the passage side than the first antenna, and at least a part of an outer periphery of a region where the first antenna is provided.
3. The gate apparatus according to supplementary note 1 or 2, wherein
    the radio wave absorbing material is also provided on a back surface side of the first antenna in the recessed portion.
4. The gate apparatus according to any one of supplementary notes 1 to 3, wherein
    the radio wave absorbing material is provided at least in a part of a portion of the lateral surface facing the passage where the recessed portion is not formed.
5. The gate apparatus according to supplementary note 3 or supplementary note 4 citing supplementary note 3, wherein
    the radio wave absorbing material covers at least a range being irradiated from the first antenna provided in a recessed portion of another housing on a facing side.
6. The gate apparatus according to any one of supplementary notes 1 to 5, further including
    a second antenna being provided on an entrance side of the passage, wherein the radio wave absorbing material is further provided on a back surface side of the second antenna.
7. The gate apparatus according to any one of supplementary notes 1 to 6, wherein
    both the first and the second housings include the recessed portion, the first antenna, and the radio wave absorbing material.
8. The gate apparatus according to any one of supplementary notes 1 to 7, wherein
    the first antenna is provided on a bottom surface of the recessed portion.
9. The gate apparatus according to any one of supplementary notes 1 to 8, wherein
    the first antenna reads a radio frequency (RF) tag that moves together with a person passing through the passage.

REFERENCE SIGNS LIST

10 Gate apparatus
20 Opening/closing door
22 Rotation control unit
30 Passage
110 Housing
110a First housing
110b Second housing
112 Lateral surface
114 Front surface
120 Recessed portion
120a Bottom surface
122 Inner lateral surface
124 Region
126 Cavity
130 First antenna
132 Second antenna
140 Radio wave absorbing material
142 Radio wave absorbing material
144 Radio wave absorbing material
146 Radio wave absorbing material
150 Human sensor
152 Human sensor
160 Control unit
1010 Bus
1020 Processor
1030 Memory
1040 Storage device
1050 Input/output interface
1060 Network interface

What is claimed is:

1. A gate apparatus comprising:
   first and second housings defining a passage through which a person passes;
   a recessed portion being provided in a lateral surface, facing the passage, of at least one of housings being the first housing and the second housing;
   a first antenna being provided in the recessed portion; and
   a radio wave absorbing material being provided in a region located closer to the passage side than the first antenna, wherein
   the radio wave absorbing material is also provided on a back surface side of the first antenna in the recessed portion, and
   the radio wave absorbing material covers, from among side surfaces of one housing, at least a range being irradiated from the first antenna provided in a recessed portion of another housing, the at least a range being an area including a bottom surface of the recessed portion of the one housing.

2. The gate apparatus according to claim 1, wherein the radio wave absorbing material is provided on a region which is equivalent to a region located closer to the passage side than the first antenna, and at least a part of an outer periphery of a region where the first antenna is provided.

3. The gate apparatus according to claim 1, wherein the radio wave absorbing material is provided at least a part of a portion of the lateral surface facing the passage where the recessed portion is not formed.

4. The gate apparatus according to claim 1, further comprising
   a second antenna being provided on an entrance side of the passage, wherein
   the radio wave absorbing material is further provided on a back surface side of the second antenna.

5. The gate apparatus according to claim 1, wherein both the first and the second housings include the recessed portion, the first antenna, and the radio wave absorbing material.

6. The gate apparatus according to claim 1, wherein the first antenna is provided on a bottom surface of the recessed portion.

7. The gate apparatus according to claim 1, wherein the first antenna reads a radio frequency (RF) tag that moves together with a person passing through the passage.

* * * * *